C. B. GARRETT.
VALVE.
APPLICATION FILED OCT. 15, 1915.
1,169,718.
Patented Jan. 25, 1916.
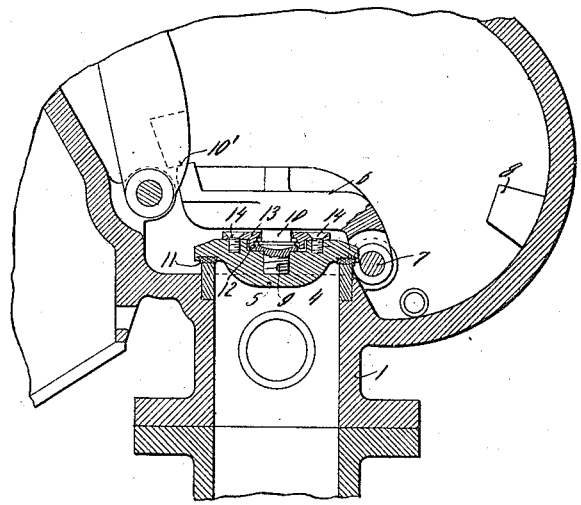
Inventor
Charles B. Garrett.
Witness
C. B. Foster
By Wood & Wood
Attorneys

UNITED STATES PATENT OFFICE.

CHARLES B. GARRETT, OF CINCINNATI, OHIO, ASSIGNOR TO THE GLOBE AUTOMATIC SPRINKLER COMPANY, OF CINCINNATI, OHIO, A CORPORATION OF PENNSYLVANIA.

VALVE.

1,169,718.        Specification of Letters Patent.        Patented Jan. 25, 1916.

Original application filed January 26, 1914, Serial No. 814,306. Divided and this application filed October 15, 1915. Serial No. 55,930.

*To all whom it may concern:*

Be it known that I, CHARLES B. GARRETT, a citizen of the United States, and residing at Cincinnati, in the county of Hamilton and State of Ohio, have invented a new and useful Improvement in Valves, of which the following specification is a full disclosure.

My invention relates to a check valve primarily embodied as a component of a dry pipe valve for automatic fire extinguishing features. In its use it is located within an intermediate chamber of a dry pipe valve, and seated under a regulated pressure and released by trip mechanism effective upon a predetermined change in pressure of the system. The check valve is adapted to be seated under a heavy pressure which is applied centrally against the valve to distribute the seating force uniformly against its entire seat area to insure against leakage.

An object of the invention is to provide a check valve with an adjustable axial abutment plug as a universal joint element for connecting the valve to a lever arm, combining with means for locking the plug in its adjusted position within the valve, with the correlation of the various parts rendering any one indispensable to assemblage. This latter feature makes proper assembling compulsory, avoiding errors which might be hazardous to operation of the system.

Other objects of the invention will be obvious from the annexed drawing and the following description thereof, and in such drawing, like characters of reference denote corresponding parts throughout the several views, of which:—

Figure 1 is a central vertical section through a portion of a dry pipe valve, and check valve to which this invention is directed. Fig. 2 is a top plan view of the check valve.

The invention herein is divisional from an application filed by me January 26, 1914, Serial No. 814,306, for improvement in dry pipe valves, which fully discloses the check valve in its preferred use, and therefore reference should be had to such application when viewed in its preferred aspect for a more complete disclosure as to its method of control and in the means therefor. In such designated use advantages of its construction will be more apparent than from a separated and broader field of utility.

The check valve is mounted within a body member or casing 1, which forms a part of a conduit and is provided with a valve-seat-equipped opening 4 to be sealed by the check valve 5. The water inlet valve 5 is loosely mounted upon the arm 6, which is fulcrumed upon a bearing 7 within the intermediate chamber, and at one side of the valve seat opening 4. The wall or the body of the casing 1, opposite the valve, is recessed to receive the valve and its arm when swung to their open or tripped position, to position the same beyond the seat opening, so as not to obstruct the flow of the water and also to prevent the valve automatically closing when it has been moved to its complete open position. The casing or body 1 is provided with a stop lug 8, which is engaged by the arm 6, when swung to its abnormal position. The valve is centrally provided with an adjusting screw 9, having a concaved head to receive the convex head of the boss 10 projected from the arm 6, forming a knuckle connection for flexibly or hingedly mounting the valve to the arm so that the sealing pressure from the lever system is brought axially upon the valve equalizing the pressure annularly upon the seat. This also provides means for adjusting the bearing point or surface 10′ of the arm or rocking lever 6 relative to its compression lever, so as to bring the arm bearing surface to a definite location or position after refacing the metal packing ring 11. The contour of the adjusting screw 9, see Fig. 2, is of polygonal form, adapted to be engaged within a correspondingly shaped recess of the boss 12 projected from the split nut-lock members 13, removably secured to the upper surface of the valve 5 by the screws 14. The nut-lock members are concentrically apertured to receive the shank portion of the boss 10 in securing the valve to the arm or rocking lever 6. The nut-lock member therefore provides a gland for connecting the valve and rocking lever and a lock for the screw. The use of all parts is essential for a proper setting of the valve and cannot be dispensed with or erroneously applied.

Having thus described my invention, I claim as new and desire to secure by Letters Patent of the United States:—

1. A device of the nature disclosed, combining a casing having a valve-seat-equipped opening, a disk-valve therefor having a hub protuberance at one side within its circumferential seat margin, a lever fulcrumed within the casing adapted to swing across said opening, an adjustable member axially engaged into said valve having a socketed head loosely engaging with said lever, and of polygonal contour, and a retaining member removably fixed upon said valve graspingly engaged with said lever and interlockingly housing said adjustable member.

2. A device of the nature disclosed combining a casing forming a part of the conduit of a fire extinguishing system, having a valve-seat-equipped opening as an entrance into said casing, a valve for said opening, a lever fulcrumed to swing across said opening comprising an element of a system of levers for holding the valve under pressure upon its seat, a member axially adjustable within one side of said valve having a socketed engagement with said lever, and a clip member secured to said valve inclosing said adjustable member for connecting said valve and lever.

3. A device of the nature disclosed combining a casing forming a part of the conduit of a fire extinguishing system having a valve-seat-equipped opening as an entrance into said casing, a valve for said opening, a lever fulcrumed to swing across said opening, an adjustable member axially engaged with said valve having a head of polygonal contour, and socketed axially with said lever, and a nut-lock anchoring member secured to said valve embracing said head and engaged with said lever.

4. A device of the nature disclosed, combining a casing having a valve-seat-equipped opening, a valve for said opening axially provided with an adjustable abutment-plug, and a lever mounted to swing across said opening secured to said valve and engaged with said abutment plug.

5. In a device of the nature disclosed, a casing forming a part of a conduit of a fire extinguishing system, having a valve-seat-equipped opening as an entrance into said casing, a lever fulcrumed to swing across said opening, a valve, means intervening between said lever and valve and axially with said valve flexibly spacing the same and adjustable to change the spacing, and anchor means for uniting said lever and valve and locking said spacing means to its adjustment.

6. A swing checked valve comprising a casing having a valve-seat-equipped opening, a valve element, a fulcrumed member for swingingly mounting said valve element, a spacing element upon said member and valve element loosely engaged and axially with said valve element, one thereof adjustable to change the spacing, and a lock member for said spacing element.

7. A device of the nature disclosed combining a casing, having a valve-seat-equipped opening, a valve for said opening having a lever-engaging insert abutment, a lever for supporting and forcibly seating said valve engaged with said abutment.

8. A device of the nature disclosed combining a casing, having a valve-seat equipped opening, a valve therefor, an adjustable lever engaging abutment engaged with said valve, a lever for swingingly supporting said valve engaged with said abutment, and a combined gland and locking member for uniting said lever and valve and interlockingly engaged with said abutment to confine its adjustment.

9. A device of the nature disclosed combining a casing having a valve-seat-equipped opening, a valve therefor, an abutment insert for said valve, and a lever for said valve engaged with said abutment insert.

In witness whereof, I hereunto subscribe my name, as attested by the two subscribing witnesses.

CHARLES B. GARRETT.

Witnesses:
EMMA SPENER,
L. A. BECK.

Copies of this patent may be obtained for five cents each, by addressing the "Commissioner of Patents, Washington, D. C."